United States Patent Office  2,756,216
Patented July 24, 1956

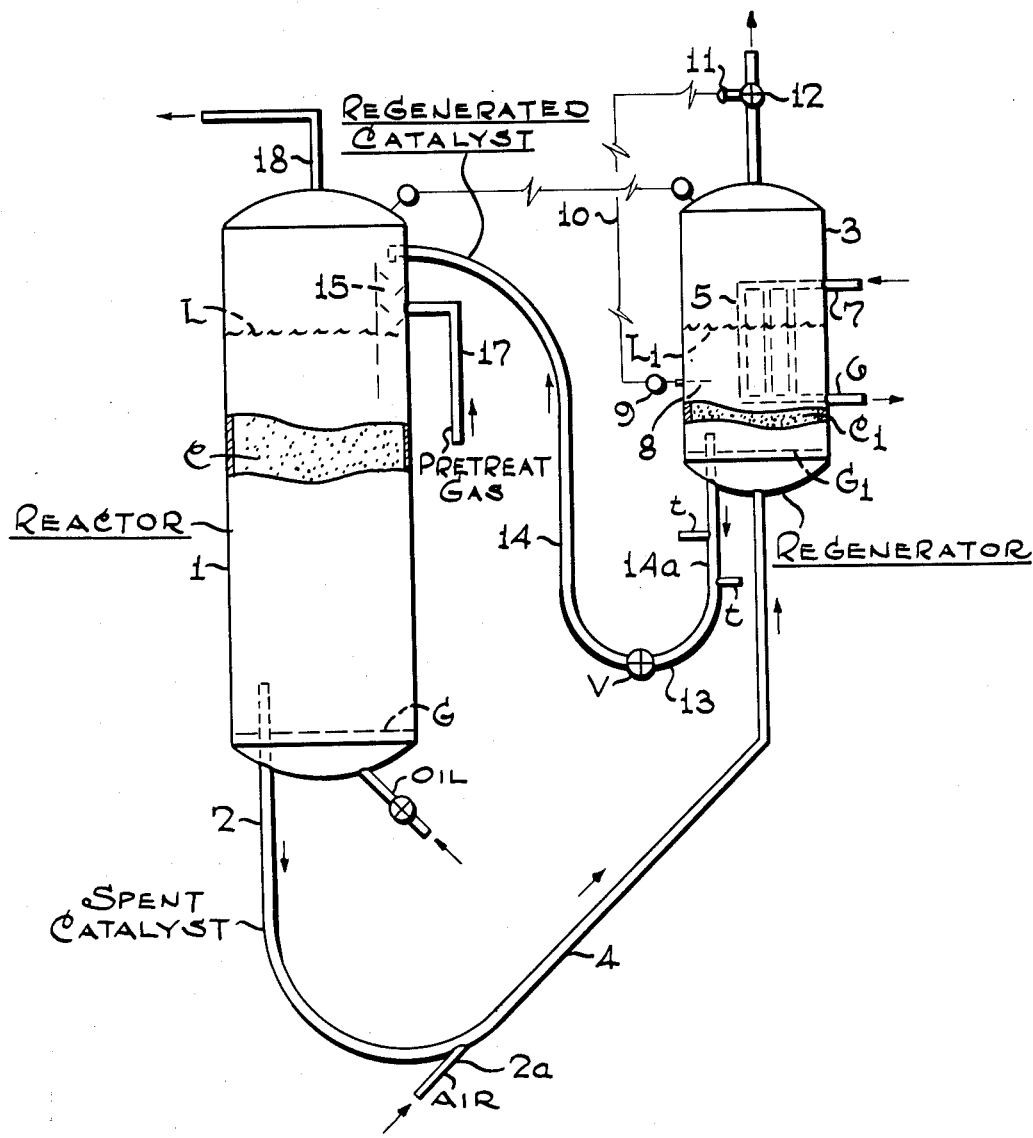

2,756,216

HYDROFORMER REGENERATOR TEMPERATURE CONTROL

Richard J. Yoder, Elizabeth, N. J., assignor to Esso Research and Engineering Company, a corporation of Delaware Application August 28, 1952, Serial No. 306,900

6 Claims. (Cl. 252—417)

The present invention relates to improvements in the regeneration of hydroforming catalysts which have become contaminated with deposits during use in the process and which therefore require at least periodic regeneration to restore their activity. More particularly, the present invention relates to regenerating powdered catalyst which is employed in the hydroforming process utilizing the fluidized catalyst technique.

It is, of course, well known that regenerating solid catalyst with air or other oxygen containing gas may injure the catalyst by overheating the same unless care is taken to prevent such overheating. For example, when regenerating a hydroforming catalyst such as a group VI metal oxide carried on alumina with air, it is required that the temperature of regeneration does not exceed about 1100°–1200° F., for temperatures above this level tend to cause baking or fusion of the catalyst which greatly impairs its activity. Therefore, prior to this invention, it was common practice while regenerating such catalysts by means of a regeneration gas containing oxygen, to abstract heat from the catalyst undergoing regeneration by cooling means. For example, cooling tubes through which a coolant was circulated were disposed in the bed of catalyst undergoing regeneration to remove heat from the hot bed.

It is first pointed out that certain relationships are referred to in the continuous fluid hydroforming of naphtha art. One of these is the catalyst to oil ratio. This has reference to the amount of catalyst expressed gravametrically, say in pounds fed to the reactor for each pound of oil also fed to the reactor. Another relationship in the present art is the space velocity which is usually expressed as units (pounds), of oil fed to the reactor per hour per unit (pound) of catalyst in the reactor. The difference between the two is that the first has to do with the catalyst circulation rate between the reactor and the regenerator and the second has to do with the contact or residence time of oil in the reactor. Both influence the results obtained.

According to the present invention, in order to protect the catalyst undergoing regeneration at all times during such regeneration, a substantial portion of the heat liberated during regeneration is abstracted by means of cooling coils immersed in the bed of fluidized catalyst undergoing regeneration. Depending on conditions prevailing in the system such as the amount of coke formed on the catalyst during the onstream hydroforming phase process, it may become necessary to vary the amount of heat abstracted from the catalyst during regeneration. The present invention provides economical means for achieving this result by varying the amount of heat abstracted from the catalyst responsive to variations in the heat released in the regenerator during the said regeneration. In brief, the present invention comprises varying the degree of immersion of the cooling coils in the dense fluidized bed of catalyst in the regeneration zone according to the heat removal requirements to protect the catalyst from injury, but at the same time to retain the maximum amount of heat as sensible heat of catalyst for transfer of such heat to the reactor, to support the endothermic reaction occurring in the latter zone. Stated otherwise, the sensible heat content of the regenerated catalyst is measured by the maximum temperature at which it can be regenerated and the maximum amount of heat that can be carried as sensible heat of the regenerated catalyst returned to the reactor to satisfy, at least in part, the heat requirements of the latter.

As is known in any fluidized bed, a dilute catalyst phase is superimposed upon the heavier dense phase. According to the present invention, cooling tubes are partially immersed in the dense phase, but extend upwardly into the dilute phase. Now the coefficient of heat transfer between the cooling surfaces and the catalyst in the dense phase is several times that between the cooling surfaces and the catalyst in the dilute phase. Consequently, the rate of heat transfer can be increased between the catalyst and the cooling surfaces by increasing the degree of cooling surface immersion in the dense phase and conversely this may be decreased by decreasing the degree of cooling surface immersion in the dense phase.

It is also pointed out that another aspect of the present invention involves adding heat in varying amounts by immersing heating coils in a dense fluidized bed of catalytic or other material in powdered form by varying the degree of heating surface immersion in the said dense phase of the fluidized bed of material, where a heated fluid passes through the coil.

Another aspect of the present invention involves controlling the temperature of a hydroforming catalyst during the regeneration when the said catalyst is in the form of a fluidized bed by varying the bed level in the regenerator and with it the degree of cooling coil immersion in the dense phase of the regenerator and a zone containing catalyst undergoing pretreatment, or hydrogen reduction of the newly regenerated catalyst, submerging a greater or lesser area of heat transfer surface in the said dense bed in the regenerator, responsive to the requirements of heat removal. It is pointed out, in this same connection, that in case of a hydroforming catalyst, the same during regeneration undergoes a valence change wherein it is oxidized. In other words, where, for example, the catalyst is 10 weight per cent molybdenum oxide and about 90 weight per cent alumina, the latter being a carrier, the molybdena withdrawn from the reactor for regeneration has a valency of from about 4 to 5 but during regeneration, the molybdenum oxide is oxidized to the $MoO_3$ form, a valence of 6. It is not advisable to charge the catalyst containing molybdenum with a valence of 6 to the reactor and consequently it is usually "pretreated," namely, treated with a hydrogen containing gas to reduce its valence to about 4 to 5.

The main object of the present invention, therefore, is to control the regeneration of a catalyst or other solid during the treatment of the said material with an oxygen containing gas to protect the said material against injury by overheating.

A specific object of the present invention is to regenerate a hydroforming catalyst under controlled temperature conditions in a manner which is cheap and efficient.

Other and further objects of the present invention will appear in the following more detailed description and claims, read in connection with the accompanying drawing.

In the accompanying drawing there is set forth, diagrammatically, an apparatus in which the present invention may be carried into effect.

Before proceeding with a description of the parts of the apparatus depicted in the accompanying drawing, it is pointed out that the improvements have reference to a system comprising two vessels, namely, a reaction vessel and a regeneration vessel in which system the fluidized solids technique is employed and further in which the catalyst circulates between the two vessels. The system also includes such accessory apparatus as are necessary for the successful operation thereof as, for example, in the case of hydroforming a separate pretreating vessel may be employed and, of course, the system would also include in a commercial plant, furnaces for preheating the oil feed, the hydrogen-containing gas which is fed to the reactor with the feed oil, as well as the various transfer lines, coolers, fractionating towers, etc. which would normally be employed in the said commercial plant. In the interest of simplicity, and to focus attention on the present improvements, only that portion of the apparatus is shown in the drawing which is necessary to illustrate the present invention.

Referring in detail to the drawing and speaking in terms of that embodiment of the invention which has reference to the hydroforming process, 3 represents the regenerator which contains a bed of hydroforming catalyst C which is in the form of a dense fluidized bed extending from a grid or other gas distributing means $G_1$, to an upper dense phase level $L_1$. Between L and the top of the regenerator there is a dilute suspension of catalyst in gasiform material. The air enters the bottom of the regenerator 3 through line 4 thence passes upwardly through the catalyst $C_1$ at a velocity such as to maintain catalyst in a fluidized state. This gas velocity necessary to maintain catalyst in the fluidized state is well known. In the case where the hydroforming catalyst is in powdered form and has a composition of say 10 weight per cent $MoO_3$ on 90 weight percent alumina, the superficial velocity of the gasiform material in the regenerator which will effect good fluidization of the catalyst without excessive loss of catalyst from the dense phase varies within the range of from about ½ to 1½ feet per second when the catalyst has the following particle size distribution:

| | Per cent by weight |
|---|---|
| 0–20 microns | 0–15 |
| 20–40 microns | 10–30 |
| 40–80 microns | 30–50 |
| 80–200 microns | 15–60 |

With other catalysts (e. g. iron catalyst, oil cracking gel catalyst, etc.) both the particle size and the gas velocities vary somewhat from those given above but the art has now become apprized of what these values should be with respect to most catalysts in order to achieve the dense fluidized bed.

In regenerating the hydroforming catalyst, the same would be charged to the regenerator at an elevated temperature, say, a temperature within the range of about 850–950° F. Under the influence of the air which burns the carbonaceous deposits formed on the catalyst during the onstream hydroforming phase, the temperature of the catalyst is increased by the heat of combustion of said carbonaceous deposits.

In order to prevent overheating of the catalyst in regenerator 3, the following procedure is adopted. Spent catalyst is withdrawn from reactor 1 through a line 2 which may be an "aerated" standpipe provided with spaced gas taps (not shown) and charged into a stream of air introduced into the system through line 2a. The catalyst is formed into a suspension in line 4 and in this form is carried into a regenerator 3 where it passes upwardly through a gas distributing means $G_1$ and is formed into a second fluidized bed $C_1$ viz. in the same manner as the bed of catalyst C was formed in reactor 1. This fluidized bed extends from $G_1$ to an upper dense phase level $L_1$. As usual in this type of operation the space between $L_1$ and the top of vessel 3 contains a dilute suspension of catalyst in gasiform material. A bank of tubes is immersed, at least partly, as shown, in the fluidized bed of catalyst $C_1$. A cooling fluid is charged to the bank of tubes 5 through line 6 and withdrawn from said tubes through line 7.

Depending on the amount of heat necessary to be abstracted from the bed of catalyst $C_1$ the upper dense phase level $L_1$ in vessel 3 is raised or lowered by means automatically responsive to a pressure differential existing between the regenerator 3 and a catalyst pre-reducing stripping section 15 shown at the top of reactor 1. This pressure differential is in turn responsive to the temperature prevailing in regenerator 3 as will subsequently appear. Thus, if the temperature in $C_1$ tends to increase to a dangerously high level, a thermocouple 8 disposed in the bed $C_1$ actuates an electric relay 9 and a column of compressed air 10, the valve gear 11 causing the valve 12 to move into more opened position. The result of this is that the pressure in vessel 3 is lowered and catalyst is caused to flow from vessel 1 via lines 2 and 4 into vessel 3 at a faster rate, whereupon the cooling coil 5 is immersed to a greater degree in the dense phase $C_1$ thus exposing a greater surface of the catalyst in the dense phase to the cooling surfaces of coil 5, and thus causing a faster heat transfer rate from the catalyst bed to the said cooling surfaces. When the proper temperature level has been achieved, the valve 12 will be manipulated into more open or more closed position, responsive to the temperature conditions in 3, by the mechanism indicated.

It should be pointed out that the instruments effecting the motivation of valve 12 are well known and are commercially available, and since such instrumentation, per se, does not go to the heart of the present invention, it need not be described in greater detail. It will be sufficient to point out that any suitable instrumentation of the character indicated that will activate a valve automatically into more open or more closed position responsive to temperature differentials may be employed.

The regenerated catalyst is withdrawn from regenerator 3 and passed to the said pretreating means 15 by means which avoid the necessity of employing a slide valve in the transfer line, as will presently appear.

The catalyst is withdrawn from the regenerator through a U-bend seal section 13 into the connecting vertical riser 14. Riser 14 extends to the top of pretreater 15 where it discharges catalyst to be pretreated at that point. Aeration taps $t$ are provided in standpipe or downflow leg 14a which connects the regenerator 3 through loop 13 with vertical riser 14 to supply the minimum amount of nitrogen or other aerating gas required to maintain fluidity in the seal section 13 with maximum catalyst density. Flow is effected from the regenerator 3 through lines 14a, 13, and 14 into pretreating section 15 by maintaining sufficiently greater pressure in vessel 3 than in vessel 15 to cause the catalyst to flow in the desired direction. In other words, by maintaining a higher pressure in regenerator vessel 3, the total pressure at the bottom of standpipe 14a which results from the gas pressure at the top of regenerator 3, plus the fluistatic pressure of the catalyst in bed $C_1$, plus the fluistatic pressure in standpipe 14a, can be made to exceed the back-pressure at the base of upflow leg 14, which results from the fluistatic pressure of the catalyst in upflow riser 14, plus the gas pressure existing in the top of the pretreater, causing a flow of catalyst toward 15 which tends to equalize the pressure differential thus created.

The upflow portion of loop 13 between the lowermost point of U-bend 13 and the point of discharge into pretreater 15 functions as a positive pressure seal opposing any forces which might tend to make gas from riser 14 flow back into the regenerator 3 against the desired direction of flow. This sealing effect exists because the fluistatic pressure at the lowermost point of the U-bend is greater than it is at the point of discharge into pretreater section 15. The downflow portion of seal section 13 between regenerator level $L_1$ and the lowermost point of the U-bend builds up a pressure head in addition to the pressure in the regenerator sufficient to counterbalance the pressure differential which causes the sealing effect in the upflow portion of seal section 13.

The catalyst in line 14 is charged to the top of a stripper 15 where it flows downwardly over inclined baffles 16 against an upflowing gas which is charged to the bottom of the pretreater through line 17 as shown. This gas is preferably a hydrogen-containing gas of say 50 to 75% concentration, and it serves to strip the catalyst of steam, $CO_2$, oxygen and other occluded gases, and at the same time to pretreat the catalyst, that is, to lower its valence to the degree previously mentioned. The treated catalyst descends by gravity into the dense phase C.

The products of the reaction are withdrawn from vessel 1 through a line 18 and delivered to a product recovery system (not shown).

In order to more fully explain the present invention and the best manner in which it may be performed, the following specific example is set forth.

EXAMPLE

*Conditions in reactor 1*

| | |
|---|---|
| Average temperature | 900° F.–950° F. |
| Pressure | 150–250 p. s. i. g. |
| Space velocity—lbs. of oil per hr. per lb. of catalyst in reactor. | 0.38–0.74. |
| Catalyst to oil ratio | 0.90–3.0. |
| Cu. ft. of recycle hydrogen fed to the reactor per barrel of oil feed. | 4400–6,000. |
| Superficial gas velocity in reactor | 0.2–.7 feet per second. |
| Concentration of hydrogen in recycle gas. | 50–85%. |

*Conditions in regenerator 3*

| | |
|---|---|
| Pressure | 5 to 10 lbs. above that in reactor 1. |
| Temperature | 1125° F.–1150° F. |
| Percentage of regenerator cooling surface in dense phase. | 70%–90%. |
| Overall heat transfer coefficient from cooling surfaces to dense phase. | B. t. u./hr./ft.$^2$/° F.– 100. |
| Overall heat transfer coefficient for total fixed cooling surface. | B. t. u./hr./ft.$^2$/° F. 91–73. |
| Average coolant temperature | 325° F. |
| Average Delta T | 800° F. |
| Average heat transfer per sq. ft. of total fixed cooling surfaces. | 72,800 B. t. u./hr./ft.$^2$– 58,400 B. t. u./hr./ft.$^2$ |

It is to be noted that catalyst flow from the bottom of reactor 1 to regenerator 3 is through a U-bend and a reverse standpipe, thus eliminating the necessity for flow control valves in this transfer means. However, as a precautionary measure, it is desirable to provide a valve V in the transfer lines, as, for example, in section 13.

The advantages of the present invention are as follows:
1. A source of solids-free condensate for boiling feed water is not required.
2. The heat transfer coils are not subjected to thermal shock of excessive thermal stresses.
3. A level control slide valve is not needed.
4. The unit pressure balance (and hence catalyst circulation rate) is not affected in the process of controlling the temperature.

To recapitulate briefly, the novelty in the previously described present invention comprises a means for controlling the temperature in a fluidized catalyst regenerator by varying the pressure differential between the regenerator and the regenerated catalyst pretreat vessel, which in turn varies bed level in the regenerator leg, forcing catalyst from the regenerator at a rate submerging a greater or lesser area of heat transfer surface in the dense bed depending on the amount of heat required to be removed to prevent overheating the catalyst.

Numerous modifications of the present invention may be made without departing from the spirit thereof.

What is claimed is:
1. A method for controlling the temperature of a powdered catalytic material undergoing regeneration in a regeneration zone in the form of a dense fluidized bed of said powdered catalytic material which comprises contacting the fluidized bed with cooling tubes in the said regeneration zone in such a manner that the said cooling tubes are partially submerged in the said dense fluidized bed of catalyst, providing a second fluidized bed of said catalytic material in a second separate zone, which last named zone is at a lower pressure and is in communication with said first named zone and causing the powdered catalytic material to flow from the regeneration zone to the said second named zone through a U-shaped conduit and maintaining a gas seal between said zones while controlling the rate of flow therebetween without the use of mechanically controlled valves by causing catalyst to flow from the regeneration zone through a downcomer leg of said U-shaped conduit, continuing the passage of the powdered catalytic material through the base of the said U-shaped conduit and upwardly through a riser leg in communication with said second named zone, developing electrical energy responsive to the temperature of the catalyst in the regeneration zone, controlling the efflux from the regeneration zone responsive to the developed electrical energy, thereby controlling the pressure in the regeneration zone, thereby also controlling the level of the fluid bed of catalyst contained in the regeneration zone by controlling the flow of catalyst thereto in a confined stream from the second zone, whereby the immersion of the cooling tubes is in turn controlled to permit the desired amount of cooling.

2. The method set forth in claim 1 in which the pressure in the regeneration zone exceeds that in the second named zone by about 5 pounds.

3. The method set forth in claim 2 in which said second named zone is a catalyst pretreating zone.

4. The method set forth in claim 3 in which the regenerated catalyst is treated with a hydrogen-containing gas in the said pretreating zone.

5. The method set forth in claim 1 in which the catalytic material is a sixth group metal oxide carried on an alumina support.

6. The method set forth in claim 1 in which the said regeneration zone constitutes a zone for regeneration of a hydroforming catalyst.

References Cited in the file of this patent
UNITED STATES PATENTS

| | | |
|---|---|---|
| 2,112,733 | Burnham | Mar. 29, 1938 |
| 2,412,025 | Zimmerman | Dec. 3, 1946 |
| 2,447,043 | Welty et al. | Aug. 17, 1948 |
| 2,462,861 | Gunness | Mar. 1, 1949 |
| 2,533,026 | Matheson | Dec. 5, 1950 |
| 2,573,795 | Lanning | Nov. 6, 1951 |
| 2,589,124 | Packie | Mar. 11, 1952 |
| 2,601,676 | Trainer et al. | June 24, 1952 |